(12) United States Patent
Davoust et al.

(10) Patent No.: US 10,451,045 B2
(45) Date of Patent: Oct. 22, 2019

(54) WIND TURBINE INCLUDING SENSOR ASSEMBLY AND METHOD OF OPERATING SUCH

(71) Applicant: GENERAL ELECTRIC COMPANY, Schenectady, NY (US)

(72) Inventors: Samuel Davoust, Bavaria (DE); Andreas Herrig, Bavaria (DE); Albert Fisas Camanes, Saratoga Springs, NY (US)

(73) Assignee: General Electric Company, Schenectady, NY (US)

( * ) Notice: Subject to any disclaimer, the term of this patent is extended or adjusted under 35 U.S.C. 154(b) by 315 days.

(21) Appl. No.: 15/661,897

(22) Filed: Jul. 27, 2017

(65) Prior Publication Data

US 2019/0032640 A1 Jan. 31, 2019

(51) Int. Cl.
*F03D 17/00* (2016.01)
*F03D 1/06* (2006.01)
*F03D 7/04* (2006.01)
*G01P 5/26* (2006.01)
*G01P 13/00* (2006.01)
*F16H 1/28* (2006.01)

(52) U.S. Cl.
CPC .............. *F03D 17/00* (2016.05); *F03D 1/06* (2013.01); *F03D 7/042* (2013.01); *G01P 5/26* (2013.01); *G01P 13/0006* (2013.01); *F05B 2260/40311* (2013.01); *F05B 2270/32* (2013.01); *F05B 2270/404* (2013.01); *F05B 2270/8042* (2013.01); *F16H 1/28* (2013.01)

(58) Field of Classification Search
CPC ........................ F03D 17/00; F05B 2270/8042
See application file for complete search history.

(56) References Cited

U.S. PATENT DOCUMENTS

| 7,281,891 B2 | 10/2007 | Smith et al. |
| 7,342,323 B2 | 3/2008 | Avagliano et al. |
| 7,950,901 B2 * | 5/2011 | Barbu .................. F03D 7/0224 415/1 |
| 8,692,983 B1 | 4/2014 | Chapman et al. |

(Continued)

OTHER PUBLICATIONS

Harris, M., et al., "Lidar for Turbine Control," Technical Report NREL/TP-500-39154, pp. 1-47 (Mar. 1, 2005-Nov. 30, 2005).

(Continued)

*Primary Examiner* — Richard A Edgar
*Assistant Examiner* — Brian O Peters
(74) *Attorney, Agent, or Firm* — Armstrong Teasdale LLP

(57) ABSTRACT

A wind turbine includes a hub configured to rotate about an axis at a first rotation speed and at least one blade coupled to the hub. The wind turbine also includes a sensor assembly configured to detect at least one characteristic of wind flowing through the wind turbine. The sensor assembly is mounted to the hub. The sensor assembly includes a laser device configured to emit a laser beam and at least one optical element configured to direct the laser beam. The sensor assembly also includes a non-motorized mechanism configured to rotate the at least one optical element at a second rotation speed when the hub rotates at the first rotation speed. The second rotation speed is greater than the first rotation speed.

20 Claims, 3 Drawing Sheets

(56) References Cited

U.S. PATENT DOCUMENTS

| | | | | |
|---|---|---|---|---|
| 8,866,322 B2 * | 10/2014 | Tchoryk, Jr. | ............. | G01P 5/26 |
| | | | | 290/44 |
| 9,163,612 B2 * | 10/2015 | Smook | .................... | F03D 80/70 |
| 2006/0140764 A1 | 6/2006 | Smith et al. | | |
| 2009/0046289 A1 | 2/2009 | Caldwell et al. | | |

OTHER PUBLICATIONS

Mikkelsen, T., et al., "Lidar Wind Speed Measurements form a Rotating Spinner," EWEC, pp. 1-8 (Apr. 23, 2010).
Vaughan, J. M. and Forrester, P.A., "Laser doppler velocimetry applied to the measurement of local and global wind," Wind Engineering, vol. 13, No. 1, pp. 1-15 (Jan. 1, 1989).
Extended European Search Report and Opinion issued in connection with corresponding EP Application No. 18185573.5 dated Nov. 26, 2018.
Mikkelsen, T. K., et al., "Lidar wind speed measurements from a rotating spinner," EWEC 2010 Proceedings online European Wind Energy Association (2010).

* cited by examiner

WIND TURBINE INCLUDING SENSOR ASSEMBLY AND METHOD OF OPERATING SUCH

BACKGROUND

The field of the disclosure relates to wind turbines, and more particularly to wind turbines including sensor assemblies for detecting characteristics of wind.

Most known wind turbines include a rotor having multiple blades. The rotor is sometimes coupled to a housing, or nacelle, that is positioned on top of a base, for example, a tubular tower. At least some known utility grade wind turbines, i.e., wind turbines designed to provide electrical power to a utility grid, have rotor blades having predetermined shapes and dimensions. The rotor blades transform kinetic wind energy into blade aerodynamic forces that induce a mechanical rotational torque to drive one or more generators, subsequently generating electric power.

Wind turbines are exposed to large variations in wind inflow, which exerts varying loads to the wind turbine structure, particularly the wind turbine rotor and shaft. Some known wind turbines include sensor assemblies to detect characteristics of the wind such as direction and speed remotely. The detected wind characteristics are used to provide optimized power performance and to control the mechanical loads of the wind turbine. The accuracy, cost, and reliability of the sensor assemblies are at least partially determined by a scanning speed of the sensor assemblies. Some sensor assemblies include active scanning systems and/or laser devices that are configured to emit multiple laser beams. However, active scanning systems and multiple beam laser devices increase the cost to assemble and operate the sensor assemblies. Accordingly, it is desirable to provide a sensor assembly for a wind turbine that has increased accuracy and does not require active scanning systems and/or multiple beam laser devices.

BRIEF DESCRIPTION

In one aspect, a wind turbine is provided. The wind turbine includes a hub configured to rotate about an axis at a first rotation speed and at least one blade coupled to the hub. The wind turbine also includes a sensor assembly configured to detect at least one characteristic of wind flowing through the wind turbine. The sensor assembly is mounted to the hub. The sensor assembly includes a laser device configured to emit a laser beam and at least one optical element configured to direct the laser beam. The sensor assembly also includes a non-motorized mechanism configured to rotate the at least one optical element at a second rotation speed when the hub rotates at the first rotation speed. The second rotation speed is greater than the first rotation speed. The wind turbine further includes a controller configured to regulate at least one operating parameter of the wind turbine based on the at least one characteristic of wind.

In another aspect, a sensor assembly is configured to detect at least one characteristic of wind that flows through a wind turbine. The sensor assembly includes a laser device configured to emit a laser beam and at least one optical element configured to direct the laser beam. The sensor assembly also includes a mount configured to couple to a hub of the wind turbine. The sensor assembly further includes a non-motorized mechanism positioned between the hub and the at least one optical element. The non-motorized mechanism is configured to rotate the at least one optical element at a second rotation speed when the hub rotates at a first rotation speed. The second rotation speed is greater than the first rotation speed In a further aspect, a method of operating a wind turbine is provided. The method includes rotating a hub about an axis at a first rotation speed and rotating at least one blade coupled to the hub at the first rotation speed. The method also includes emitting, using a laser device of a sensor assembly, a laser beam. The method further includes directing the laser beam using at least one optical element. The method also includes rotating, using a non-motorized mechanism, the at least one optical element at a second rotation speed when the hub rotates at the first rotation speed. The second rotation speed is greater than the first rotation speed. The method also includes receiving, using the sensor assembly, the laser beam after the laser beam interacts with an object and determining, using the sensor assembly, at least one characteristic of wind flowing through the wind turbine. The method further includes regulating at least one operating parameter of the wind turbine based on the at least one characteristic of wind determined using the sensor assembly.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The systems and methods described herein provide a sensor assembly for use in determining characteristics of wind that flows through a wind turbine. The sensor assembly is mounted to a hub of the wind turbine and provides increased accuracy in comparison to at least some known sensor assemblies. For example, the hub-mounted sensor assembly has a line of sight that is not obstructed by turbine blades. In addition, the sensor assembly includes a non-motorized mechanism configured to increase the rotational speed of at least one optical element of the sensor assembly relative to the hub. Accordingly, the sensor assembly provides the scanning capabilities of a multiple beam scanning device without requiring an active or motorized scanning system. As a result, the sensor assembly reduces the cost to assemble and operate wind turbines. In addition, in some embodiments, the wind characteristics detected by the sensor assembly are used to optimize power performance and/or control mechanical loadings of the wind turbine.

Figure 1:
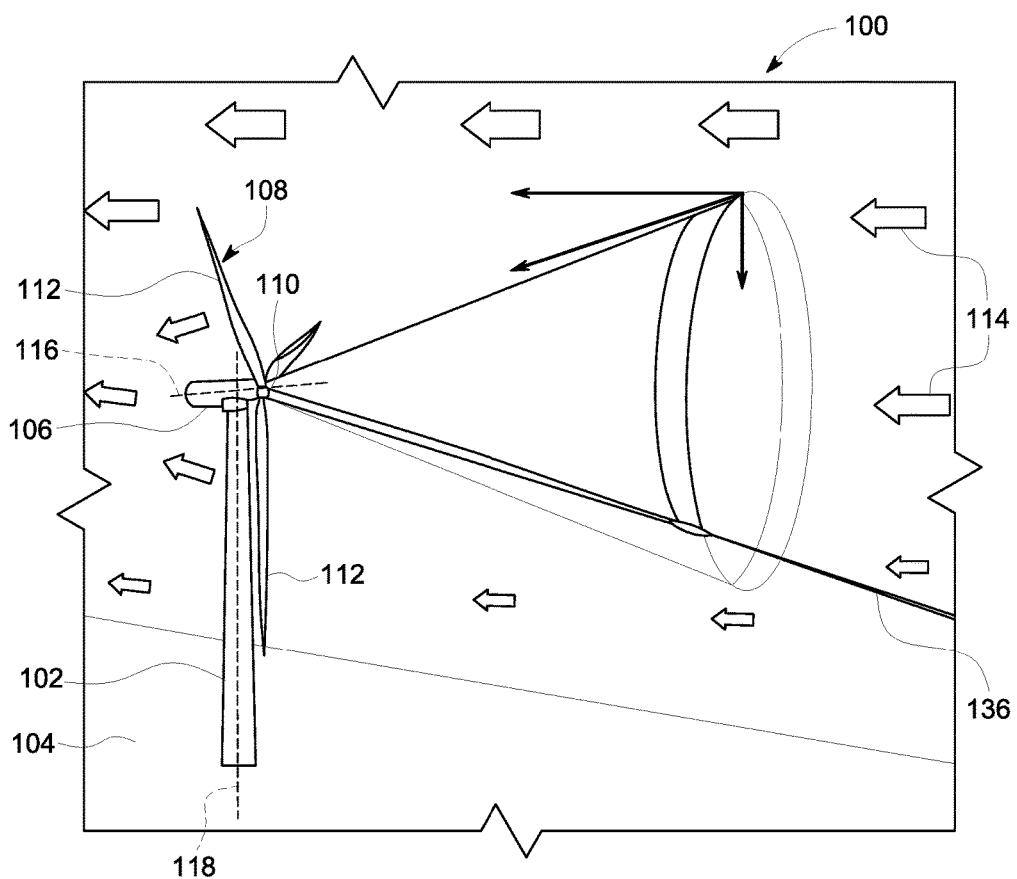
FIG. 1 is a schematic perspective view of an exemplary wind turbine.

FIG. 1 is a schematic perspective view of an exemplary wind turbine 100. In the exemplary embodiment, wind turbine 100 is a horizontal axis wind turbine. Wind turbine 100 includes a tower 102 extending from a supporting surface 104, a nacelle 106 coupled to tower 102, and a rotor 108 coupled to nacelle 106. Rotor 108 has a rotatable hub 110 and a plurality of rotor blades 112 coupled to rotatable hub 110. In the exemplary embodiment, rotor 108 has three rotor blades 112. In alternative embodiments, rotor 108 has any number of rotor blades 112 that enables wind turbine 100 to function as described herein. In the exemplary embodiment, tower 102 is fabricated from tubular steel and has a cavity (not shown in FIG. 1) extending between supporting surface 104 and nacelle 106. In alternative embodiments, wind turbine 100 includes any tower 102 that enables wind turbine 100 to operate as described herein. For example, in some embodiments, tower 102 is a lattice tower.

In the exemplary embodiment, blades 112 are positioned about rotor hub 110 to facilitate rotating rotor 108 when wind 114 flows through wind turbine 100. When rotor 108 rotates, kinetic energy from wind 114 is transferred into usable mechanical energy, and subsequently, electrical energy. During operation, rotor rotates about a horizontal axis 116 that is substantially parallel to supporting surface 104. In addition, in some embodiments, rotor 108 and nacelle 106 are rotated about tower 102 on a yaw axis 118 to control the perspective of blades 112 with respect to the direction of wind 114. In alternative embodiments, wind turbine 100 includes any rotor 108 that enables wind turbine 100 to operate as described herein.

Figure 2:
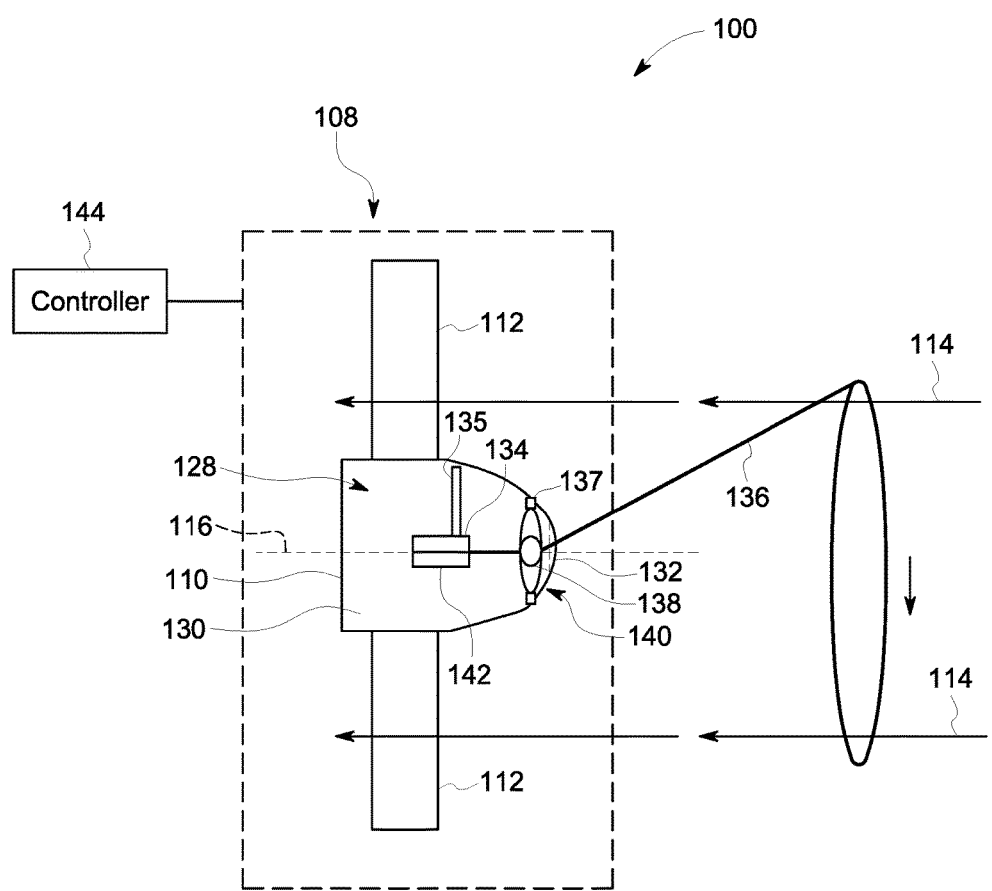
FIG. 2 is a schematic cross-sectional view of a rotor of the wind turbine shown in FIG. 1.

FIG. 2 is a schematic cross-sectional view of rotor 108 of wind turbine 100. In the exemplary embodiment, wind turbine 100 includes a sensor assembly 128 mounted to rotatable hub 110. Specifically, in the exemplary embodiment, sensor assembly 128 is coupled to an interior of rotatable hub 110 such that sensor assembly 128 is disposed within a cavity 130 defined by rotatable hub 110. A view panel or window 132 extends across the tip of rotatable hub 110 and allows sensor assembly 128 to transmit and receive light therethrough. Accordingly, rotatable hub 110 protects sensor assembly 128 from the environment and increases the service life of sensor assembly 128. In addition, the position of sensor assembly 128 reduces obstructions of sensor assembly 128. In alternative embodiments, sensor assembly 128 is mounted in any manner that enables wind turbine 100 to operate as described herein. For example, in some embodiments, sensor assembly 128 extends at least partially on the exterior of rotatable hub 110. In further embodiments, sensor assembly 128 is mounted to the exterior of rotatable hub 110. In some embodiments, sensor assembly 128 is mounted to nacelle 106 (shown in FIG. 1) and not necessarily to rotatable hub 110.

In the exemplary embodiment, sensor assembly 128 is configured to detect at least one characteristic of wind 114 flowing through wind turbine 100. For example, in some embodiments, sensor assembly 128 uses a light detection and ranging (LiDAR) process. In the exemplary embodiment, sensor assembly 128 includes a laser device 134, at least one optical element 138, a non-motorized mechanism 140, and a photosensor 142. Laser device 134 is configured to emit a laser beam 136 (also shown in FIG. 1) and optical element 138 is configured to direct laser beam 136. In the exemplary embodiment, laser device 134 is configured to emit a single laser beam 136. In some embodiments, laser device 134 is configured to emit no more than two laser beams 136. As a result, the cost to assemble and operate wind turbine 100 is reduced in comparison to at least some known wind turbines including sensors that are configured to emit five or more laser beams.

Also, in the exemplary embodiment, laser device 134 is coupled to rotatable hub 110 by a mount 135 and is configured to rotate with rotatable hub 110. Non-motorized mechanism 140 is coupled to rotatable hub by a mount 137 and extends between rotatable hub 110 and optical element 138. Non-motorized mechanism 140 is configured to rotate optical element 138 relative to rotatable hub 110 during operation of sensor assembly 128. In alternative embodiments, rotatable hub 110, laser device 134, optical element 138, and/or non-motorized mechanism 140 are coupled in any manner that enables wind turbine 100 to operate as described herein. For example, in some embodiments, non-motorized mechanism 140 is configured to any component of sensor assembly 128, including laser device 134, relative to rotatable hub 110.

In addition, in the exemplary embodiment, non-motorized mechanism 140 is passive and does not require motors or active mechanisms to rotate optical element 138, as described herein. For example in some embodiments, non-motorized mechanism 140 includes a differential system such as a gear system configured to provide an accelerated rotation for optical element 138. In alternative embodiments, sensor assembly 128 includes any non-motorized mechanism 140 that enables wind turbine 100 to operate as described herein. For example, in some embodiments, non-motorized mechanism 140 includes a biasing member such as spring that is configured to facilitate reciprocation or oscillation of at least a portion of sensor assembly 128 relative to rotatable hub 110 when rotatable hub 110 rotates at the first speed.

During operation, in the exemplary embodiment, rotatable hub 110 is configured to rotate about horizontal axis 116 at a first rotation speed. For example, in some embodiments, the first rotation speed is within a range of about 5 revolutions per minute (rpm) to about 20 rpm. In the exemplary embodiment, non-motorized mechanism 140 is configured to rotate sensor assembly 128 at a second rotation speed when rotatable hub 110 rotates at the first rotation speed. For example, in some embodiments, the second rotation speed is at least about 60 rpm. In the exemplary embodiment, the second rotation speed is greater than the first rotation speed. Moreover, the second rotation speed is configured to facilitate sensor assembly 128 operating with an increased scanning rate. For example, in some embodiments, sensor assembly 128 is configured to provide a scanning rate of at least about 1 hertz. In alternative embodiments, rotor 108 and sensor assembly 128 are rotated at any speed that enables wind turbine 100 to operate as described herein.

Also, in the exemplary embodiment, controller 144 is coupled to wind turbine 100 and is configured to control operation of wind turbine 100. In the exemplary embodiment, controller 144 receives signals from sensor assembly 128 relating to characteristics of wind 114 flowing through wind turbine 100. Based on the signals, operation of wind turbine 100 is adjusted, if necessary, to accommodate determined inflow wind conditions. For example, in some embodiments, controller 144 regulates at least one operating parameter of wind turbine 100 based on the at least one characteristic of wind determined using sensor assembly 128. In further embodiments, the determined characteristic is used to optimize power performance and/or control mechanical loadings of the wind turbine. In some embodiments, the detected characteristics of wind 114 are stored and/or used to generate a model.

In addition, in the exemplary embodiment, sensor assembly 128 detects the characteristics of wind 114 with more reliability and accuracy than at least some known sensors because sensor assembly 128 is mounted to rotatable hub 110 and rotates at the second rotation speed. Moreover, non-motorized mechanism 140 reduces downtime of sensor assembly 128 because non-motorized mechanism 140 is not vulnerable to motor breakdowns. In alternative embodiments, sensor assembly 128 has any configuration that enables wind turbine 100 to operate as described herein. For example, in some embodiments, laser device 134 is configured to emit more than two laser beams 136 to further increase the scanning speed of sensor assembly 128.

Moreover, in the exemplary embodiment, sensor assembly 128 includes any optical element(s) 138 that enables sensor assembly 128 to operate as described herein. For example, in some embodiments, optical element 138 includes a mirror and/or a lens. In further embodiments, a surface of optical element 138 is faceted such that optical element 138 forms a prism. In addition, in the exemplary embodiment, sensor assembly 128 includes any number, including one, of optical elements 138 that enable sensor assembly 128 to operate as described herein. Also, in the exemplary embodiment, a centerline of optical element 138 is offset from laser beam 136 such that optical element 138 directs laser beam 136 in a cone pattern. In alternative embodiments, sensor assembly 128 has any configuration that enables sensor assembly 128 to operate as described herein.

Figure 3:
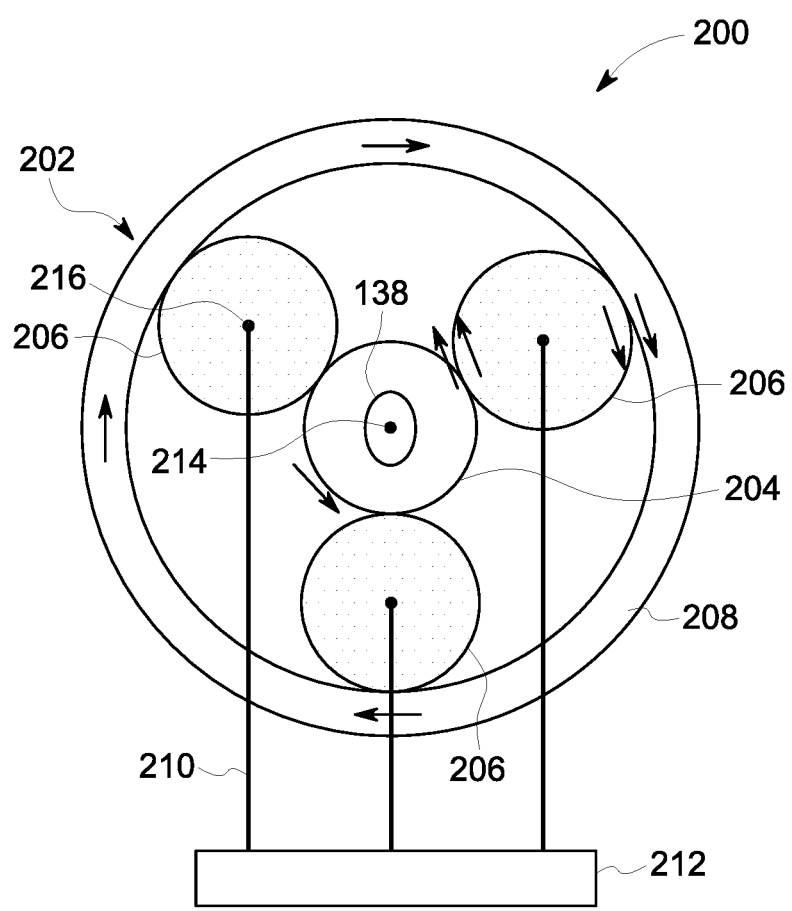
FIG. 3 is a schematic front view of an exemplary non-motorized mechanism for rotating an optical element of the wind turbine shown in FIGS. 1 and 2.

FIG. 3 is a schematic front view of an exemplary non-motorized mechanism 200 for rotating optical element 138 of wind turbine 100 (shown in FIGS. 1 and 2). Non-motorized mechanism 200 includes a plurality of gears forming a gear system 202. In the exemplary embodiment, gear system 202 is a planetary or epicyclic gear system and includes a sun or central gear 204, planetary gears 206, a ring gear 208, and a carrier 210. Central gear 204 and ring gear 208 are configured to rotate about a central axis 214. Planetary gears 206 are positioned circumferentially about central gear 204. Each planetary gear 206 rotates about an axis 216. In alternative embodiments, non-motorized mechanism 200 includes any gear system 202 that enables rotary machine to operate as described herein.

Also, in the exemplary embodiment, gear system 202 includes three planetary gears 206 spaced equidistant about central gear 204. Ring gear 208 is substantially annular and extends about planetary gears 206. In alternative embodiments, gear system 202 includes any gears that enable gear system 202 to operate as described herein. For example, in some embodiments, gear system 202 includes four or more planetary gears 206. In further embodiments, gear system 202 includes a second stage of planetary or epicyclic gears including a second sun or central gear 204, second planetary gears 206, and/or a second ring gear 208.

In addition, in the exemplary embodiment, non-motorized mechanism 200 is coupled to rotatable hub 110 (shown in FIGS. 1 and 2) such that rotation of rotatable hub 110 induces rotation of gear system 202. Gear system 202 is configured such that ring gear 208 rotates at a first rotation speed and central gear 204 rotates at a second rotation speed which is greater than the first rotation speed. In particular, in the exemplary embodiment, ring gear 208 is coupled to rotatable hub 110 such that ring gear 208 rotates with rotatable hub 110. Ring gear 208 extends about central gear 204 and planetary gears 206. Ring gear 208 engages each of planetary gears 206 such that rotation of ring gear 208 induces rotation of planetary gears 206. Planetary gears 206 are engaged with central gear 204 such that rotation of planetary gears 206 induces rotation of central gear 204. Also, in the exemplary embodiment, carrier 210 includes a weight 212 providing a gravitational force. Carrier 210 is configured to inhibit planetary gears 206 rotating about central gear 204. In alternative embodiments, gear system 202 has any configuration that enables non-motorized mechanism 200 to operate as described herein. For example, in some embodiments, central gear 204 is stationary and weight 212 is omitted such that planetary gears 206 rotate about central gear 204. In further embodiments, optical element 138 is configured to rotate with planetary gears 206.

Moreover, in the exemplary embodiment, optical element 138 is coupled to central gear 204. Accordingly, optical element 138 rotates with central gear 204 at the second rotation speed when rotatable hub 110 (shown in FIGS. 1 and 2) rotates at the first rotation speed. In alternative embodiments, optical element 138 is coupled to non-motorized mechanism 200 in any manner that enables sensor assembly 128 (shown in FIG. 2) to operate as described herein. For example, in some embodiments, optical element 138 is coupled to carrier 210.

In reference to FIGS. 1-3, a method of operating wind turbine 100 includes rotating rotatable hub 110 and blade 112 about horizontal axis 116 at a first rotation speed. The method also includes rotating, using non-motorized mechanism 140, optical element 138 at a second rotation speed when rotatable hub 110 rotates at the first rotation speed. The method further includes emitting a laser beam 136 and directing laser beam 136 using at least one optical element 138. In some embodiments, laser beam 136 travels in a cone pattern and interacts with objects in wind 114. The method further includes receiving, using photosensor 142, laser beam 136 after laser beam 136 interacts with an object. The method also includes determining, using sensor assembly 128, at least one characteristic of wind 114 flowing through wind turbine 100.

The above described embodiments provide a sensor assembly for use in determining characteristics of wind that flows through a wind turbine. The sensor assembly is mounted to a hub of the wind turbine and provides increased accuracy in comparison to at least some known sensor assemblies. For example, the hub-mounted sensor assembly has a line of sight that is not obstructed by turbine blades. In addition, the sensor assembly includes a non-motorized mechanism configured to increase the rotational speed of at least one optical element of the sensor assembly relative to the hub. Accordingly, the sensor assembly provides the scanning capabilities of a multiple beam scanning device without requiring an active or motorized scanning system. As a result, the sensor assembly reduces the cost to assemble and operate wind turbines. In addition, in some embodiments, the wind characteristics detected by the sensor assembly are used to optimize power performance and/or control mechanical loadings of the wind turbine.

An exemplary technical effect of the methods, systems, and apparatus described herein includes at least one of: (a) providing non-motorized mechanisms to increase the scanning speed of sensor assemblies for wind turbines; (b) increasing the accuracy of the sensor assemblies; (c) providing sensor assemblies that mount to a hub of a wind turbine; and (d) decreasing the cost to assemble and operate wind turbines.

Exemplary embodiments of methods and systems for detecting inflow conditions of wind turbines are not limited to the specific embodiments described herein, but rather, components of systems and/or steps of the methods may be utilized independently and separately from other components and/or steps described herein. For example, the methods may also be used in combination with other wind turbine systems requiring in-situ recognition of wind inflow conditions and are not limited to practice with only the wind turbines and methods as described herein. Rather, the exemplary embodiment can be implemented and utilized in connection with many other applications, equipment, and systems that may benefit from detecting wind inflow conditions.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A wind turbine comprising:
   a hub configured to rotate about an axis at a first rotation speed;
   at least one blade coupled to said hub; and
   a sensor assembly configured to detect at least one characteristic of wind flowing through said wind turbine, wherein said sensor assembly is mounted to said hub, said sensor assembly comprising:
      a laser device configured to emit a laser beam;
      at least one optical element configured to direct the laser beam; and
      a non-motorized mechanism configured to rotate said at least one optical element at a second rotation speed when said hub rotates at the first rotation speed, wherein the second rotation speed is greater than the first rotation speed; and
   a controller configured to regulate at least one operating parameter of said wind turbine based on the at least one characteristic of wind.

2. The wind turbine in accordance with claim 1, wherein said non-motorized mechanism comprises at least one first gear coupled to said hub and at least one second gear coupled to said at least one optical element.

3. The wind turbine in accordance with claim 2, wherein said at least one first gear comprises a plurality of planetary gears such that said non-motorized mechanism forms a planetary gear system.

4. The wind turbine in accordance with claim 1, wherein said hub defines a cavity configured to receive said sensor assembly, and wherein said sensor assembly is disposed at least partially within the cavity.

5. The wind turbine in accordance with claim 1, wherein said non-motorized mechanism is coupled to said laser device and is configured to rotate said laser device at the second rotation speed when said hub rotates at the first rotation speed.

6. The wind turbine in accordance with claim 1, wherein said laser device is coupled to said hub and configured to rotate at the first rotation speed when the hub rotates at the first rotation speed.

7. The wind turbine in accordance with claim 1, wherein said laser device is configured to emit no more than two laser beams.

8. A sensor assembly configured to detect at least one characteristic of wind that flows through a wind turbine, said sensor assembly comprising:
   a laser device configured to emit a laser beam;
   at least one optical element configured to direct the laser beam;
   a mount configured to couple to a hub of the wind turbine; and
   a non-motorized mechanism positioned between the hub and said at least one optical element and configured to rotate said at least one optical element at a second rotation speed when the hub rotates at a first rotation speed, wherein the second rotation speed is greater than the first rotation speed.

9. The sensor assembly in accordance with claim 8, wherein said non-motorized mechanism comprises at least one first gear coupled to the hub and at least one second gear coupled to said at least one optical element.

10. The sensor assembly in accordance with claim 9, wherein said non-motorized mechanism comprises a planetary gear system.

11. The sensor assembly in accordance with claim 8, wherein the hub defines a cavity, and wherein said sensor assembly is disposed at least partially within the cavity.

12. The sensor assembly in accordance with claim 8, wherein said non-motorized mechanism is coupled to said laser device and is configured to rotate said laser device at the second rotation speed when the hub rotates at the first rotation speed.

13. The sensor assembly in accordance with claim 8, wherein said laser device is coupled to the hub and is configured to rotate at the first rotation speed.

14. The sensor assembly in accordance with claim 8, wherein said laser device is configured to emit no more than two laser beams.

15. A method of operating a wind turbine, said method comprising:
   rotating a hub about an axis at a first rotation speed;
   rotating at least one blade coupled to the hub at the first rotation speed;

emitting, using a laser device of a sensor assembly, a laser beam;

directing the laser beam using at least one optical element;

rotating, using a non-motorized mechanism, the at least one optical element at a second rotation speed when the hub rotates at the first rotation speed, wherein the second rotation speed is greater than the first rotation speed;

receiving, using the sensor assembly, the laser beam after the laser beam interacts with an object;

determining, using the sensor assembly, at least one characteristic of wind flowing through the wind turbine; and regulating at least one operating parameter of the wind turbine based on the at least one characteristic of wind determined using the sensor assembly.

16. The method in accordance with claim 15, wherein rotating the at least one optical element comprises:

rotating at least one first gear coupled to the hub at the first rotation speed; and rotating at least one second gear coupled to the at least one optical element at the second rotation speed.

17. The method in accordance with claim 16, wherein the non-motorized mechanism includes a planetary gear system, and wherein rotating the at least one first gear comprises rotating a plurality of planetary gears.

18. The method in accordance with claim 15, wherein directing the laser beam comprises directing the laser beam using at least one optical element disposed within a cavity defined by the hub.

19. The method in accordance with claim 15 further comprising rotating the laser device at the second rotation speed when the hub rotates at the first rotation speed.

20. The method in accordance with claim 15 further comprising rotating the laser device at the first rotation speed when the hub rotates at the first rotation speed.

* * * * *